3,181,886
VEHICLE TIE-DOWN STRUCTURE
Donald J. Blunden and William E. Widener, Detroit, and Robert J. Haggarty, Trenton, Mich., assignors to Whitehead & Kales Company, River Rouge, Mich., a corporation of Michigan
Filed Nov. 14, 1962, Ser. No. 237,572
9 Claims. (Cl. 280—179)

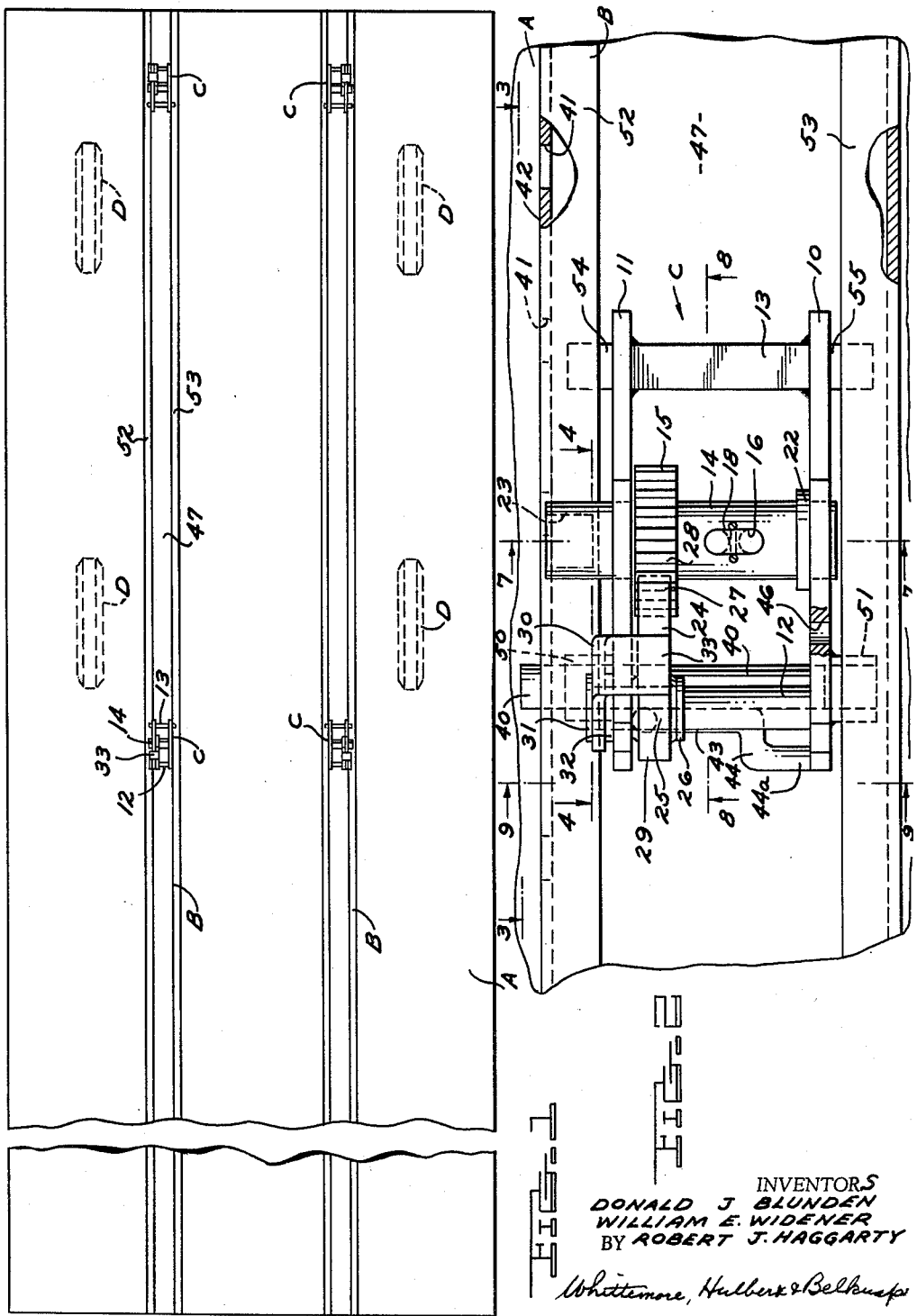

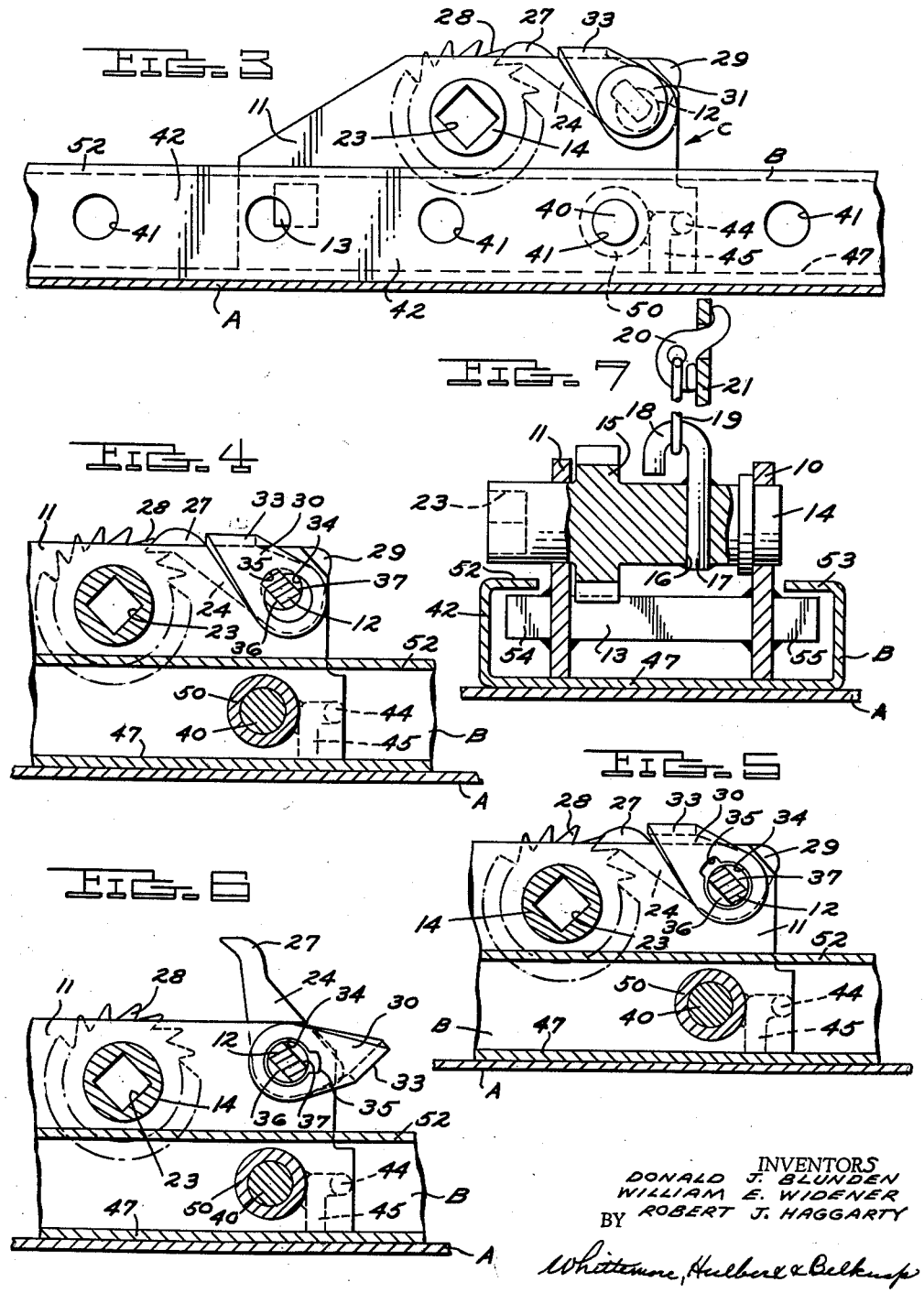

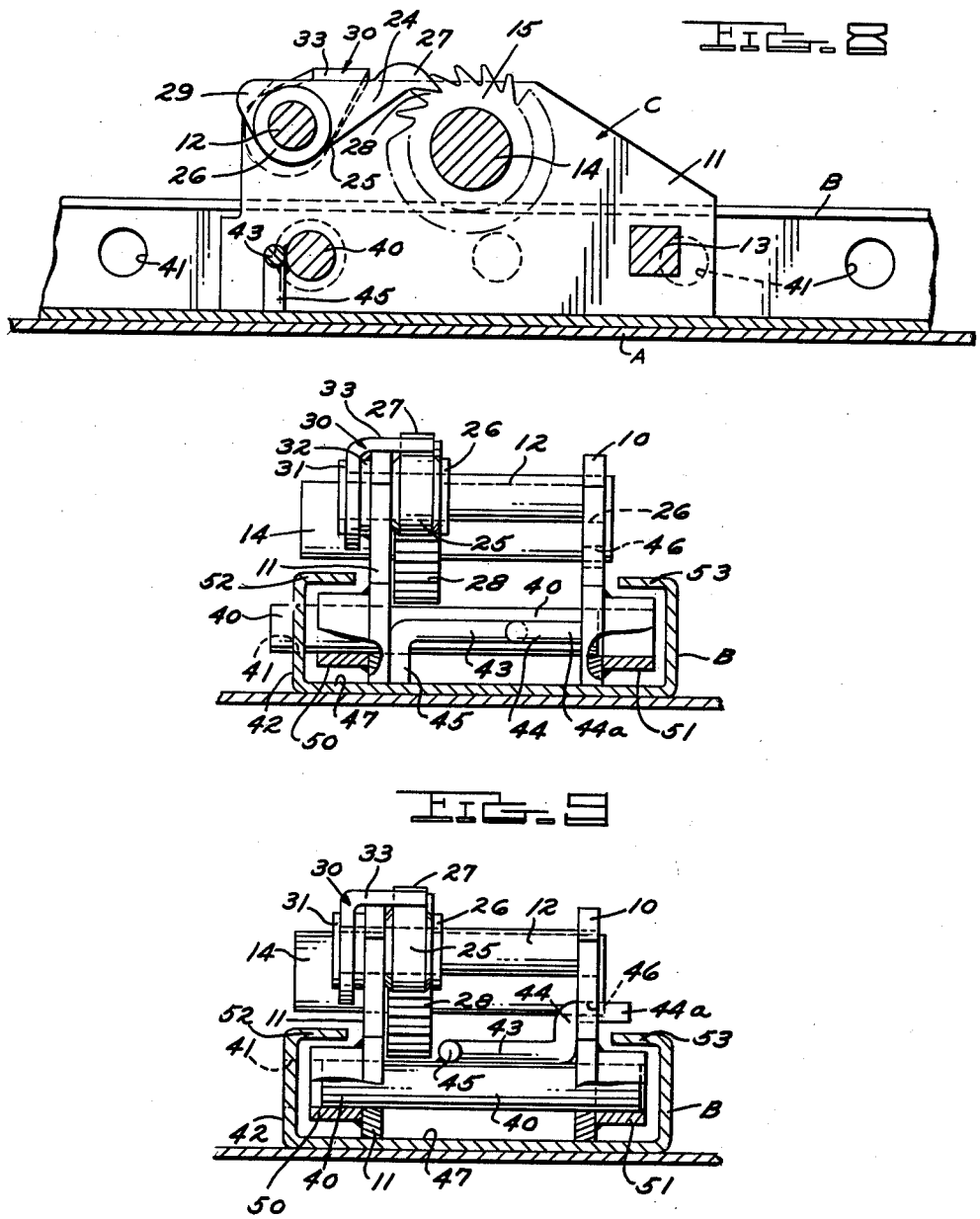

This invention relates generally to tie-down structures for motor vehicles, and refers more particularly to improvements upon the structure in United States Patent 3,038,740, dated June 12, 1962.

One of the essential objects of the invention is to provide a smaller and more economical tie-down structure wherein a locking stub shaft entirely separate from and independent of a rotatable stub shaft for the ratchet gear is slidable transversely of each adjustable carriage into engagement with one of a series of longitudinally spaced openings in the outer side wall of a main supporting channel to detachably lock such carriage in place after it has been adjusted lengthwise of the main supporting channel, and wherein a locking dog for a manually operable locking pawl for the ratchet gear is mounted for both rotary and transverse sliding movements on a fixed stub shaft for the locking pawl, whereby such locking dog may be initially rotated to a position above but free of said pawl and may thereafter be slid transversely of said stub shaft into locking engagement with said pawl.

Another object is to provide the slidable separate locking stub shaft with a longitudinally extending locking pin having end portions adapted to be positioned between and adjacent to the inner and outer side walls of the carriage to hold the locking shaft against accidental displacement after said locking shaft has been slid transversely of the carriage into locked engagement with one of the longitudinally spaced openings in the outer side wall of the main supporting channel, and having one of said end portions adapted to be engaged with and disengaged from an opening in the inner side wall of the carriage simultaneously with the transverse adjustment of said locking stub shaft out of and into locking engagement with one of the longitudinally spaced openings in the outer side wall of the main supporting channel.

Another object is to provide opposite ends of the transversely movable locking stub shaft with sleeves which are rigidly secured to the outer sides of the upright side walls of the carriage and are beneath and engageable with inturned horizontal flanges at the upper edges of the main supporting channel to prevent the carriage from becoming disengaged vertically from said main supporting channel.

Another object is to provide the carriage with a fixed crossbar having opposite ends that are also beneath and engageable with the inturned horizontal flanges at the upper edges of the main supporting channel to prevent the carriage from becoming disengaged vertically from said main supporting channel, and that co-operate with the fixed stub shaft aforesaid to provide the carriage with structural elements to maintain the proper spaced relation between the inner and outer side walls of the carriage.

Another object is to provide a tie-down structure that is simple in construction, economical to manufacture, and efficient in use.

Other objects, advantages and novel details of construction of this invention will be made more apparent as this description proceeds, especially when considered in connection with the accompanying drawings wherein:

FIGURE 1 is a fragmentary top plan view of a longitudinally extending elongated deck of a transport vehicle equipped with a tie-down structure embodying our invention, and showing by dotted lines the positions of four ground engaging wheels of one vehicle supported upon said deck.

FIGURE 2 is an enlarged fragmentary top plan view of a tie-down structure embodying our invention, with parts broken away and in section.

FIGURE 3 is a vertical sectional view taken substantially on the line 3—3 of FIGURE 2.

FIGURE 4 is a vertical sectional view taken substantially on the line 4—4 of FIGURE 2.

FIGURE 5 is a vertical sectional view similar to FIGURE 4, but showing the locking dog in raised unlocked position.

FIGURE 6 is a vertical sectional view similar to FIGURE 4, but showing the pawl and locking dog swung back to inoperative positions.

FIGURE 7 is a vertical sectional view taken substantially on the line 7—7 of FIGURE 2, and showing a tie-down chain broken away and terminally connected to the anchorage member and to the frame of a vehicle.

FIGURE 8 is a vertical sectional view taken substantially on the line 8—8 of FIGURE 2.

FIGURE 9 is a vertical sectional view taken substantially on the line 9—9 of FIGURE 2, and showing the stub shaft in locked position in one of the openings in the outer upright side wall of a main supporting channel.

FIGURE 10 is a vertical sectional view similar to FIGURE 9, showing the stub shaft disengaged from one of the openings in the outer upright side wall of a main supporting channel, and showing the inner end of the locking pin in locked position in the hole therefor in the inner side wall of the carriage.

Referring now to the drawings, A is a longitudinally extending elongated substantially flat deck of a transport vehicle for motor vehicles, B are stationary main supporting channels or rails disposed in laterally spaced substantially parallel relation to each other and extending throughout substantialy the entire length of said deck, and C are relatively short carriages that are within the main channels B at longitudinally spaced points thereof and are individually adjustable longitudinally of the main channels.

Preferably the area of the deck A is such that it is capable of supporting thereon in tandem several vehicles of various sizes, i.e. vehicles having different lengths and/or widths. In the present instance, we have shown in FIGURE 1 an outline of the four ground engaging wheels D of one of the motor vehicles mentioned.

The parallel main supporting channels B are rigidly secured to and serve effectively as reinforcements for the supporting deck A to prevent such deck from bending or buckling under the load of the vehicles in tandem thereon. Such main supporting channels B also serve as guides for the vehicles while they are being loaded onto or unloaded from the supporting deck A.

The adjustable carriages C are slidable lengthwise of and are supported by the main supporting channels B. Preferably four adjustable carriages C are provided for each vehicle and are arranged in transversely aligned pairs at longitudinally spaced points of the main supporting channels B.

Each adjustable carriage C has laterally spaced inner and outer upright side walls 10 and 11, a transversely extending fixed stub shaft 12 extending through said upright side walls adjacent the upper edges thereof at one end thereof, and a transversely extending fixed crossbar 13 extending through said upright side walls adjacent the lower edges thereof at the opposite end thereof. Such crossbar 13 cooperates with the fixed stub shaft 12 to provide the carriage C with structural elements to maintain the proper spaced relation between the inner and outer side walls 10 and 11 of the carriage C.

Rotatably mounted in the spaced side walls 10 and 11 of each carriage C in spaced parallel relation to the fixed stub shaft 12 is a stub shaft 14 provided at longitudinally spaced points thereof between the inner and outer side walls 10 and 11 of the carriage C with a ratchet gear 15 and a transversely extending opening 16. The ratchet gear 15 is preferably located adjacent the outer side wall 11 of the carriage and is fixed to said stub shaft 14, while the opening 16 is substantially midway between the ratchet gear 15 and the inner side wall 10 of the carriage and receives one arm 17 of an inverted substantially U-shaped anchorage member 18 for a flexible tie-down chain, cable or the like 19 provided at its free end with a hook 20 by which said chain may be detachably connected to the frame 21 or other suitable part of a motor vehicle to be tied down. Preferably the arm 17 of the anchorage member 18 is rigidly secured in the opening 16 in the stub shaft 14, and the tie-down chain 19 may be connected in any suitable manner to the inverted substantially U-shaped anchorage member 18.

The ratchet gear 15 is engageable with the outer side wall 11 of the carriage to prevent the rotatable stub shaft 14 from moving transversely of the carriage C in one direction, while an annular flange or collar 22 fixed to the rotatable stub shaft 14 is engageable with the inner side wall 10 of the carriage to prevent the stub shaft 14 from moving transversely of the carriage in the opposite direction. The stub shaft 14 is provided at the outer end thereof with an axially extending outwardly opening polygonal socket 23 for the reception of a correspondingly shaped end portion of an operating crank (not shown) by which the stub shaft 14 may be rotated to cause the tie-down chain 19 to be wound upon said stub shaft 14 and thereby tensioned or tightened when it is desired to tie down a motor vehicle.

A manually operable pawl 24 is provided at one end with a hub 25 rotatably mounted on the fixed shaft 12 between the outer side wall 11 of the carriage C and an annular flange or collar 26 fixed to the shaft 12 in spaced relation to said outer side wall 11, and has a free end portion 27 that is engageable with one of the teeth 28 of the ratchet gear 15 to hold the latter and its supporting shaft 14 against rotation in an anticlockwise direction when the tie-down chain 19 has been tightened. Preferably the hub 25 of this pawl is provided with a radially extending arm or finger piece 29 by which said pawl 24 may be manipulated.

Mounted for both rotary and transverse sliding movements relative to the fixed shaft 12 is a locking dog 30 for the manually operable pawl 24. As shown, this locking dog 30 is located between spaced annular discs or flanges 31 and 32 upon the outer side of the outer upright side wall 11 of the carriage C. The disc 31 is secured to the shaft 12, while the disc 32 is secured to the outer upright side wall 11 of the carriage. Preferably this locking dog 30 is provided with a laterally projecting arm or flange 33 that is adapted during rotary movement of the locking dog 30 relative to said fixed shaft 12 to extend transversely over and in spaced relation to the upper edge of the pawl 24 when the latter is in engagement with one of the teeth 28 of the ratchet gear 15, and that is adapted during sliding movement of the locking dog 30 transversely of said shaft 12 to engage and hold the pawl 24 against accidental displacement from the engaged tooth of the ratchet gear 15. As shown, this locking dog 30 has a circular opening 34 to receive the fixed shaft 12 during rotary movement of the locking dog relative to the shaft 12, and has at one edge of the circular opening an elongated slot 35 adapted to receive and straddle diametrically opposed flat portions 36 and 37 of the shaft 12 during sliding movement of the locking dog 30 transversely of said shaft 12 to thereby hold the locking dog 30 against rotation so that the pawl 24 will be maintained in locked position. Thus the locking dog 30 may be rotated to and from a position where the laterally projecting arm or flange 33 is spaced above the pawl 24, and then may be slid transversely of the shaft 12 to position the laterally projecting arm or flange 33 in locking engagement with the pawl 24.

Mounted for both sliding and rotary movements relative to each carriage C is an independent locking stub shaft 40. Preferably this stub shaft 40 is slidable transversely of the carriage C to engage one of a series of longitudinally spaced openings 41 in the outer upright side wall 42 of the main supporting channel B to detachably lock such carriage C in place after the latter has been adjusted lengthwise of the main supporting channel B, and is rotatable to enable opposite ends of a locking pin 43 extending longitudinally of and fixed to said shaft 40 to be positioned between and adjacent to the inner and outer side walls 10 and 11 of the carriage C to hold the locking shaft 40 against accidental displacement after it has been slid transversely of the carriage C into locked engagement with one of the longitudinally spaced openings 41 in the outer side wall 42 of the main supporting channel B.

Opposite ends 44 and 45 of the locking pin 43 are preferably bent relative to the pin proper. As shown, the end 44 of the locking pin 43 is bent into an L configuration so that the free end 44a of the L may be slid into a hole 46 in the inner side wall 10 of the carriage C to enable the locking stub shaft 40 to be simultaneously slid out of the engaged opening 41 in the outer side wall 42 of the main supporting channel B to permit the carriage C to be moved longitudinally of the main supporting channel B. When the free end 44a of the L is withdrawn from said hole 46, the locking stub shaft 40 is simultaneously slid into locking engagement with one of the openings 41 in the outer side wall 42 of the main supporting channel B. The other end 45 of the locking pin 43 is bent at right angles to the locking stub shaft 40 so that it may engage and rest upon the base 47 of the main supporting channel B during rotation of the locking shaft 40 following the removal of the free end 44a of the L from the hole 46 in the inner side wall 10 of the carriage C and the simultaneous insertion of the locking shaft 40 into locked engagement with one of the openings 41 in the outer side wall 42 of the main supporting channel B.

After the locking stub shaft 40 has been rotated to position the other end 45 of the locking pin 43 upon the base 47 of the main supporting channel B the end 44a of the locking pin 43 is upon the inner side of and adjacent the inner upright side wall 10 of the carriage, and the other end 45 of the locking pin 43 is upon the inner side of and adjacent the outer upright side wall 11 of the carriage so that the locking stub shaft 40 is effectively held in locked position within one of the openings 41 in the outer upright side wall 42 of the main supporting channel B. In this connection, it is to be noted that the engagement of the other end 45 of the locking pin 43 with the base 47 of the main supporting channel B serves to hold the L-shaped end 44 of the locking pin in a horizontal position so that it may serve as an operating handle by which the locking stub shaft 40 may be rotated.

To prevent the carriage C from becoming disengaged vertically from the main supporting channel B, the opposite ends of the locking stub shaft 40 are provided with sleeves 50 and 51 which are rigidly secured to the side walls 10 and 11 of the carriage C and are beneath and engageable with inturned flanges 52 and 53 at the upper edges of the main supporting channel B. Also, opposite ends 54 and 55 of the crossbar 13 are beneath and engageable with the inturned flanges 52 and 53 at the upper edges of the main supporting channel B.

In use, the motor vehicles to be transported are moved onto the deck A of the transport vehicle from one end thereof to be supported in tandem thereon. Depending upon the location of the carriages C relative to the ground engaging wheels D of the motor vehicles after the latter are loaded position, the respective carriages C may be moved lengthwise of the main supporting channels B to positions in spaced relation to said ground engaging wheels D to enable the tie-down chains 19 to be extended upwardly at the proper angles from the shafts 14 for tie down purposes. The locking shafts 40 in the carriages C are then slid outwardly into engagement with selected openings 41 in the outer side walls 42 of the main supporting channels B to lock the carriages C in adjusted positions. The respective hooks 20 at the free ends of the tie-down chains 19 are then connected to suitable holes in the frames 21 of the motor vehicles. The respective stub shafts 14 are then rotated by cranks (not shown) to tighten or tension the tie-down chains 19 to tie down the motor vehicles. The respective pawls 24 are then moved into operative engagement with the selected teeth 28 of the ratchet gears 15 to hold the tie-down chains 19 in tightened condition to thereby hold the motor vehicles against displacement. The locking dogs 30 are then moved into operative retaining engagement with the pawls 24 to hold the latter against accidental displacement from the selected teeth of the ratchet gears 15.

What we claim as our invention is:

1. A motor vehicle tie-down structure, comprising a longitudinally extending channel-shaped rail adapted to be anchored lengthwise upon a longitudinally extending deck of a transport vehicle and having a plurality of longitudinally spaced openings in the outer upright side wall thereof, a carriage carried by and adjustable lengthwise of said rail, said carriage having laterally spaced upright inner and outer side walls, a rotatable stub shaft extending transversely of said carriage, a second stub shaft movable transversely of said carriage to engage a selected opening in the outer upright side wall of said rail to hold said carriage in adjusted position, means upon said transversely movable stub shaft adapted to be positioned between and adjacent to the spaced upright side walls of said carriage to hold said transversely movable stub shaft against accidental displacement after it has been moved transversely of said carriage into a selected opening in the outer upright side wall of said rail, and means for tying down and holding a motor vehicle after said carriage has been held in adjusted position, including a flexible element connected to the rotatable stub shaft and adapted to be connected to a part of the motor vehcile, said flexible element being adapted to be wound on said rotatable stub shaft and tensioned thereby during rotation thereof.

2. The structure defined in claim 1, wherein opposite upright sides of the channel-shaped rail are provided with inturned horizontal flanges, and opposite ends of the transversely movable stub shaft are provided with sleeves that are rigidly secured to the upright side walls of the carriage and are beneath and engageable with said inturned horizontal flanges to prevent the carriage from becoming disengaged vertically from said channel-shaped rail.

3. The structure defined in claim 2, wherein a crossbar is fixed to the upright side walls of said carriage and has opposite ends disposed beneath and engageable with said inturned horizontal flanges to prevent the carriage from becoming disengaged vertically from said channel-shaped rail.

4. The structure defined in claim 1, wherein the first mentioned means comprises a locking pin extending longitudinally of and secured to said transversely movable stub shaft and having end portions adapted to be positioned between and adjacent to the spaced upright side walls of said carriage.

5. The structure defined in claim 4, wherein one end portion of said locking pin is engageable with an opening in the inner upright side wall of said carriage simultaneously with the removal of said transversely movable stub shaft from a selected opening in the outer upright side wall of said rail.

6. The structure defined in claim 4, wherein one end portion of said locking pin is adapted to be engaged with and disengaged from an opening in the inner upright side wall of said carriage simultaneously with the transverse adjustment of said transversely movable stub shaft out of and into locking engagement with a selected opening in the outer upright side wall of said rail.

7. The structure defined in claim 4, wherein the end portions of the locking pin are bent relative to the pin proper, one of said ends being bent into an L configuration, the other of said ends being bent at substantially right angles to the pin proper and being engageable with the base of said channel-shaped rail to hold the end of L configuration in a horizontal position so that it may serve as an operating handle.

8. A motor vehicle tie-down structure, comprising a longitudinally extending rail adapted to be anchored lengthwise upon a longitudinally extending deck of a transport vehicle and having an upright side wall provided with a plurality of longitudinally spaced openings, a carriage carried by and adjustable lengthwise of said rail, a rotatable stub shaft extending transversely of said carriage, a ratchet gear fixed to said stub shaft, a fixed stub shaft extending transversely of said carriage, a stub shaft movable transversely of said carriage to engage a selected opening in the upright side wall of said rail to hold said carriage in adjusted position, means for tying down and holding a motor vehicle after said carriage has been held in adjusted position, including a flexible element connected to the rotatable stub shaft and adapted to be connected to a part of the motor vehicle, said flexible element being adapted to be wound on said rotatable stub shaft and tensioned thereby during rotation thereof, a locking pawl rotatably mounted on said fixed shaft and engageable with a selected tooth of said ratchet gear to hold the latter against rotation after said flexible element has been attached to a vehicle and has been tensioned, and a locking dog for said locking pawl mounted on said fixed stub shaft for both rotary and transverse sliding movements, whereby such locking dog may be initially rotated to a position above but free of said pawl and may thereafter be slid transversely of said stub shaft into locking engagement with said pawl.

9. A motor vehicle tie-down structure, comprising a longitudinally extending rail adapted to be anchored lengthwise upon a longitudinally extending deck of a transport vehicle and having an upright side wall provided with a plurality of longitudinally spaced openings, a carriage carried by and adjustable lengthwise of said rail, said carriage having laterally spaced separate upright inner and outer side walls, a rotatable stub shaft extending transversely of said carriage, a ratchet gear fixed to said stub shaft, a fixed stub shaft extending between and rigidly secured to said upright side walls at one end of said carriage, a crossbar extending between and rigidly secured to said upright side walls at the opposite end of said carriage, whereby said fixed stub shaft and said crossbar constitute structural elements to maintain the proper spaced relation between the separate upright inner and outer side walls of said carriage, a stub shaft movable transversely of said carriage to engage a selected opening in the upright side wall of said rail to hold said carriage in adjusted position, means for tying down and holding a motor vehicle after said carriage has been held in adjusted position, including a flexible element connected to the rotatable stub shaft and adapted to be connected to a part of the motor vehicle, said flexible element being adapted to be wound on said rotatable stub shaft and tensioned thereby during rotation thereof, and a locking pawl rotatably mounted on said fixed shaft and engageable with a selected tooth of said ratchet gear to hold the latter against rotation after said flexible element has been attached to a vehicle and has been tensioned.

References Cited by the Examiner
UNITED STATES PATENTS

| | | | |
|---|---|---|---|
| 3,038,740 | 6/62 | Blunden | 105—368 X |
| 3,092,368 | 6/63 | McDowell et al. | 254—164 |
| 3,120,375 | 2/64 | Haynes | 280—179 X |

A. HARRY LEVY, *Primary Examiner.*